(12) United States Patent
Bender et al.

(10) Patent No.: US 6,485,296 B1
(45) Date of Patent: Nov. 26, 2002

(54) VARIABLE MOISTURE BIOMASS GASIFICATION HEATING SYSTEM AND METHOD

(76) Inventors: Robert J. Bender, 48 Helen Ave., South Burlington, VT (US) 05403; John P. Tomassi, 25 Mt. View St., Bristol, VT (US) 05443; Frank Asplund, Hornsgatan 59A, 11849 Stockholm (SE)

( * ) Notice: Subject to any disclaimer, the term of this patent is extended or adjusted under 35 U.S.C. 154(b) by 0 days.

(21) Appl. No.: 09/970,549

(22) Filed: Oct. 3, 2001

(51) Int. Cl.[7] ................................................ F27B 15/18
(52) U.S. Cl. ........................ 432/58; 110/212; 110/203; 48/197 R
(58) Field of Search .............................. 432/14, 17, 29, 432/58; 110/210, 212, 214, 220, 222, 225, 327, 101 CD, 203, 204; 48/197 R, 203, 209; 422/144, 145, 146; 423/359

(56) References Cited

U.S. PATENT DOCUMENTS 4,378,208 A * 3/1983 Payne et al. .................. 432/14
4,535,065 A * 8/1985 Klein et al. ................... 432/15
4,848,249 A * 7/1989 Lepori et al. ............. 48/197 R
5,279,234 A * 1/1994 Bender et al. ............... 110/210
6,190,429 B1 * 2/2001 Fujimura et al. ......... 48/197 R

* cited by examiner

Primary Examiner—Gregory Wilson
(74) Attorney, Agent, or Firm—Donald W. Meeker (57) ABSTRACT

A sloping fuel grate allows primary air to flow up into a thick biomass fuel bed in a gasifier producing combustible gases. Fuel feed screws keep the fuel bed at a nearly constant height in response to a level indicator. A burner above the fuel bed admits swirling secondary air and combustible gases, burning the gases to produce a flame to heat a boiler or other heat applying device. A donut shaped collar in the burner prevents gases from leaking back into the burner. A programmable logic controller maintains the system at a desired optimum level of operation based on signals from oxygen, moisture, pressure, temperature and fuel bed height sensors. The controller sends signals to controls for primary air valves and dampers, fuel feeder, and an induced draft fan and optional combined primary and secondary air fan controlling the pressure and flow of air and gases for the system.

20 Claims, 2 Drawing Sheets

VARIABLE MOISTURE BIOMASS GASIFICATION HEATING SYSTEM AND METHOD

BACKGROUND OF THE INVENTION

1. Field of the Invention

The present invention relates to heating systems with fuel treatment means for liberating combustible gas from solid fuel and in particular to a controlled system and method for clean-emission variable biomass gasification and combustion using a thick fuel bed on stationary fixed grates with controlled evenly distributed primary air to produce gasification and a burner above the fuel with secondary air directed into the burner for burning gasses with high turbulence to enable the creation of a system using biomass containing either low or high moisture content and either low or high ash content for an efficient heating system with low emissions, and with system feedback controls to enable constantly managed combustion kept at an even rate and burning cleanly so that the system needs no down time for cleaning.

2. Description of the Prior Art

Biomass waste provides an abundant source of fuel from what might otherwise be considered waste. In addition, the plant matter from which the biomass waste comes is a renewable resource. As long as trees and other plants are harvested ecologically they keep replacing themselves with new growth by the natural growth cycle in many forests or by replanting. In addition, using plant growth as fuel maintains the natural carbon cycle in a 100% balanced state, because the clean gasification and combustion of biomass fuel puts back into the environment the same amount of carbon that occurs in the natural decay of plants. The carbon is then taken in by the living plants. However, burning coal, oil and natural gas creates a carbon overload in the environment from the centuries of stored carbon suddenly released into the environment.

Sources for biomass waste in the form of wood chips include whole tree chips from forestry maintenance including tree tops and waste in forests, brush and tree cuttings from parks and roadways, lumber mill waste, woodworking waste, crushed pallets, and any other sources of discarded wood or wood byproducts. Many other sources of biomass waste exist in other forms from landfill sites, municipal waste collection, waste from companies using plant matter in any form, paper waste, and many other sources. The community itself can become the source of fuel for the community's own plants burning biomass fuel.

The major problem with biomass fuel is the substantial creosote and smoke discharge normally associated with wood burning and biomass burning stoves and furnaces which burn at relatively low temperatures and low turbulence at low thermal efficiency rates. As well as a pollution problem, this is a great waste of resources, because the "pollutants" given off by such stoves and furnaces are hydrocarbon gases, tar and fuel particulates.

Most stoves, furnaces, and power plants using wood and biomass fuel are set up to burn somewhat efficiently, but only with specific qualities of fuels, typically limited in an allowable range of moisture content and other criteria such as phosphate content, which creates ash. Finding sources of biomass waste that meet specific requirements of moisture content and other criteria consistently is a major problem that further limits the efficiency of other systems, thereby wasting fuel and creating considerable pollution.

In other systems, such as large power plants, burning at relatively high temperatures in very large chambers "gasification" and burning of some of the hydrocarbon gases occurs spontaneously because of the high temperatures created from a huge fire source, the blown-in fuel and the fact that gases remain in some locations within the huge chambers to eventually burn up. Because these systems are relatively static and uncontrolled they are designed for a very limited range of fuel types and qualities and therefore burn less efficiently than they were designed for much of the time because of variations in fuel quality.

Smaller scale systems such as furnaces for buildings and stoves for homes are generally less efficient than the large power plants because they don't develop the same level of gasification spontaneously, because in smaller chambers the gases generally don't remain in the system as long, the same high temperature conditions are usually not attained, and fuel sources are even less uniform than municipal systems with rigid fuel requirements.

Although some systems have some controls built in to vary air input through flues or with some provision for creating gasification and combustion of the combustible gases, most systems are relatively static with no feedback means to monitor the efficiency of the system; so they fail to control the gasification and gas combustion for variations in fuel quality and climatic conditions. Most biomass and wood burning systems require considerable time and labor in monitoring and manual adjustments to maintain some level of efficiency, especially systems requiring manual loading of fuel and unloading of ash.

Most prior art systems have a problem when burning wood with bark or branches with dirt on them, because of clinkering, or the build-up of ashes and dirt on the grates and other interior furnace surfaces, requiring regular shut downs and cleaning of the systems. The shut downs may cost considerable income if the heat is producing power or other income producing energy sources. It often takes a considerable amount of time to reload the systems and get them running at an efficient level of output.

Heating systems employing thin fuel beds, especially in gasification systems with high temperatures, run the risk of damaging the grates underneath the fuel creating frequent grate problems requiring maintenance or replacement.

Most prior art heating systems with feedback controls produce quite a variance in heat output from the time the sensors detect a drop in temperature and signal the controls to the time it takes to add fuel or vary the air mixture to increase heat output. This produces ups and downs in the output with fuel inefficiencies and less than optimum burning conditions, which may produce more air pollution than desired.

While prior art patents describe technologies employing gasification, none are optimized for maximum constant thermal efficiency with no shut downs. In prior art patents, burn downs or shut downs can cause damage to the system.

U.S. Pat. No. 5,823,122, issued Oct. 20, 1998 to Chronowski et al, provides horizontal blast tubes for biomass gasifiers in FIGS. 1–3 and a vertical blast tube for a biomass gasifier in FIG. 4. They introduce swirling air, which may be preheated, into the ignition point of the fuel gas produced by the gasification of the biomass.

U.S. Pat. No. 5,634,412, issued Jun. 3, 1997 to Martin et al, indicates a method for regulating a refuse incinerator furnace using an infrared pyrometer to measure temperature of the waste gases to regulate the supply of fuel and the speed of the combustion grate and a regulating quantity derived from the mass flow of steam serves to influence the supply of primary air.

U.S. Pat. No. 5,581,998, issued Dec. 10, 1996 to Craig, puts forth a gas turbine combustor in conjunction with a biomass fueled pressurized gasifier having the fuel gas and primary air injected into a primary combustion chamber at independently controlled rates for a rich burn of the fuel gas. A nozzle leads into a secondary combustion chamber having air injected into the secondary combustion chamber at an independently controlled rate to provide a lean burn.

U.S. Pat. No. 5,505,145 issued Apr. 9, 1996 to Gross et al, concerns a process and apparatus for waste incineration in an upright shaft furnace having oxygen-containing gas fed into the lower part of the furnace into a thick fuel bed.

U.S. Pat. Nos. 5,806,440 and 5,720,231 and 5,524,556, issued Sep. 15, 1998 and Feb. 24, 1998 and Jun. 11, 1996 to Rowlette et al, show a method for controlling a draft fan at a desired rate and a draft monitoring method and the use of a microprocessor.

U.S. Pat. No. 5,694,868, issued Dec. 9, 1997 to Mitthof, claims a biomass furnace with a sloping fuel bed having underfed air and a combustion tube above at an oblique angle with a fan feeding the combustion tube.

U.S. Pat. No. 5,666,890, issued Sep. 16, 1997 to Craig, describes a biomass gasification system for producing gaseous fuel having a high pressure feed tank and a cyclone for removing suspended ash.

U.S. Pat. No. 5,655,463, issued Aug. 12, 1997 to Good, discloses a furnace for waste materials with an air inlet control to the gasification chamber to create an oxygen-starved environment and an afterburn chamber with a vacuum drawing in the gases.

U.S. Pat. No. 5,417,170, issued May 23, 1995 to Eshleman, illustrates a sloped-bottom pyrolysis chamber and solid residue collection system for processing waste, primarily hospital waste.

U.S. Pat. No. 4,870,910, issued Oct. 3, 1989 to Wright et al, provides a waste incineration method and apparatus using a first gasification chamber and a secondary combustion chamber with air controlled to both depending on temperature regulated controls.

U.S. Pat. No. 5,241,916 issued Sep. 7, 1993 to Martin, illustrates a waste furnace which supplies primary combustion air under the fuel and secondary combustion air into the flow of exhaust gas and which taps off some of the exhaust gas adjacent to the fuel and delivers it to the combustion air.

U.S. Pat. No. 5,242,295 issued Sep. 7, 1993 to Ho, gives a combustion method for waste incineration, including hazardous waste, which has two combustion zones and injects a high velocity oxidant into the second combustion zone with the first combustion zone operated under pyrolytic conditions.

U.S. Pat. No. 4,616,573 issued Oct. 14, 1986 to Giaier et al, shows a feeder for metering, decompacting and delivering refuse fuel to a furnace which may be controlled by a remote sensor or by the combustion control system.

U.S. Pat. No. 5,178,076, issued Jan. 12, 1993 to Hand et al, is for a biomass burner construction with cored apertures in refractory block members at the entrance of a horizontal second burning chamber creating a venturi-like turbulent flow, and a moving grate having an air feed and a water feed.

A number of patents show water cooled grates. U.S. Pat. No. 5,899,150, issued May 4, 1999 to Martin et al, depicts a grate element having primary air supplied from underneath and a cooling fluid which runs through the grate transversely to the movement of fuel on the grate. U.S. Pat. No. 5,913,274 issued Jun. 22, 1999 to Kunzli et al, demonstrates an incineration grate with transverse cooling tubes cast into the grate in varying proximity to account for different heat zones on the grate. Four old water grate patents also show various ways of distributing water through a grate: U.S. Pat. No. 667,607 issued Feb. 5, 1901 to Thurell, U.S. Pat. No. 828,769 issued Aug. 14, 1906 to Parkinson, U.S. Pat. No. 879,492 issued Feb. 18, 1908 to Richardson, and U.S. Pat. No. 1,170,317 issued Feb. 1, 1916 to Nye.

Biomass gasification systems, such as applicant Bender's et al prior U.S. Pat. No. 5,279,234, having the blast tube at the same level as the fuel in the gasification chamber have problems with fly ash and particulate carryover into the blast tube and sometimes out the exhaust chimney.

Systems with moving grates, such as applicant Bender's et al prior U.S. Pat. No. 5,279,234, are expensive to construct, maintain, and replace.

In co-inventor Asplund's U.S. Pat. No. 4,621,584 issued Nov. 11, 1986, a thick fuel bed system with a moving horizontal grate and vertical overhead blast tube enables the use of solid lumps and pieces of fuel of relatively high moisture content.

In co-inventor Asplund's U.S. Pat. No. 6,022,387 issued Feb. 8, 2000, a maximum gasification air flow for a gasification plant is determined by obtaining a maximum gasifier power according to different moisture contents of the fuel; determining a relationship between the moisture content of the fuel and at least one of a maximum gasification air flow and a maximum total air flow; recording moisture content of the fuel actually being processed and controlling the gasification air flow or the total air flow according to the moisture content of the fuel in order to have the gasifier being able to produce the maximum producible power at all time.

None of the prior art patents provides constantly managed combustion with small variations in operating efficiency and no clinkering prevention to avoid shut downs for cleaning.

SUMMARY OF THE INVENTION

An overall object of the present invention is to provide a controlled constantly managed, and over the flame cross section even temperature combustion system and method for clean-emission variable biomass gasification and combustion to eliminate periodic grate and gasifier maintenance, maintain very high gas exhaust quality during changing fuels and or loads, prevent grate and or ash auger clinkers, and prevent soot production and minimize both CO emission and NOx emission.

A further overall object of the present invention includes utilizing a combination of elements and procedures in an integrated system in order to improve the quality of combustion chemistry, improve exhaust gas quality, improve the combustion of marginal fuels, enable the building of large systems, and to reduce any fuel carry over as fly ash, as follows:

1) Utilize controllable air valves in order to maintain constant excess air through dividing the inlet air flow into a gasification air flow, (primary air flow) and a combustion air flow, (secondary air flow).

2) Raise the burner significantly above the fuel pile in order to prevent the combustible gas flow from creating fly ash and fuel particulate carryover.

3) Manage the size and shape of the burner utilizing combustion, mass balance, and other calculations to insure the flame will burn the combustible gas at low excess air and at the same time prevent soot production and keep the NOx level in the stack gas as low as possible.

Additional overall objects of the present invention are to enhance grate cooling to reduce wear and tear, the costs of materials, and clinker formation on the grate and around the ash auger, as follows:

1) Utilize the primary air feed system and pressure drop to distribute air up through the grates as a cooling influence on the grate material.
2) Utilize a very thick fuel bed to more completely and more evenly distribute primary air to the fuel gasification zone.
3) Introduce already burned and hot, (200 to 400 degrees F.) stack gas into the ash auger manifold to eliminate clinker formation.
4) Utilize a water pumping and distribution system to cool the ash auger. The water system is for enhanced protection from burn down or shut downs.

A further major object of the present invention is to enhance the monitor and feedback loop used to control the process in the gasifier according to load and fuel moisture content, as follows:

1) Establish a programmable logic controller (P.L.C. control) and feedback loop that continuously or periodically monitors various inputs to adjust and control fuel feed rates, draft fan speed rates, and air direction dampers, and that continuously and simultaneously corrects and advances the data base, thus allowing shifting to different loads and or different fuels without output interruption, and still maintaining excellent air quality and producing no soot.

A further object of the present invention is to provide a controlled constantly managed even temperature gasification system and method for clean-emission variable biomass gasification with a nearly constant height thick fuel bed by using a level indicator to monitor the fuel bed height and control the feed screws to keep the fuel bed at nearly constant height and also to use temperature, pressure, and moisture feedback sensors to control airflow throughout the system.

A contributory object of the present invention is to record the moisture content of the exhaust gas through measuring the oxygen content in both dry and wet exhaust gas to control the gasifier air flow (primary air flow) in order to always be able to produce the maximum possible power independent of the fuel moisture content in the fuel actually being processed in the gasifier.

A corollary object of the present invention is to constantly monitor the oxygen content of the exhaust gases to regulate the damper and the outside air input valve for the air feeding into the gasifier (gasification chamber) and the burner (blast tube) to assist in the constant managing of the gasification and combustion.

A related object of the present invention is to utilize a controllable secondary air damper in order to maintain constant excess air (constant oxygen content in the exhaust gas).

A further related object is to provide a programmable logic controller with a remote access modem for constant monitoring and control even from remote locations.

Another object of the present invention is to provide a thick fuel bed which rests on stationary large fixed grates that are never damaged by the heat from the fuel in the gasification process during normal operation because the gasification takes place on the top of the thick fuel bed and the heat therefore do not reach the fuel grate.

An ancillary object of the present invention is to provide a fixed grate with uniform air spaces across the entire grate formed by spaced apart C-channels filled with (for example) refractory material across the width of the grate to permit controlled evenly distributed primary air into the thick fuel bed for efficient processing of the fuel and to move ash down onto the auger to prevent ash collecting on the grate so that it does not require regular grate cleaning.

A related object of the present invention is to provide a sloping fuel bed grate allowing the ash to slip down by gravity to a water cooled ash auger at the bottom to remove ash so that the gasification chamber pressure is not affected by the ash removal and to admit recycled hot exhaust gas feeding into the gasification chamber directly onto the ash auger area to prevent clinkering when using fuel containing particularly low temperature ash melting components, thereby eliminating the need for regular cleaning, and to add to the air moving up through the fuel bed to produce gasification. The ash auger is controlled by a timer or by the rate of fuel feed in combination with an ash temperature control.

One more object of the present invention is to provide a burner (blast tube) above the fuel bed to burn the combustible gas produced in the gasifier and to minimize creating fly ash and particulate carryover.

A related object of the present invention is to provide the burner (blast tube) with an off-center secondary air inlet to admit air swirling into the burner inlet part and having a donut-shaped neck inside the burner after the air inlet forming a seal around the burner outlet part preventing exhaust from flowing into the burner outlet part then reducing the burner performance.

An additional object of the present invention is to monitor the pressure and temperature in the boiler (or other heat application device) to provide input into the controlling of the system, especially for an adjustable induced draft fan between the boiler and the exhaust stack to control the gas transport in the system.

A related object of the present invention is to monitor the pressure of the air under the fuel bed grate and above the fuel bed in the gasifier to provide further input into the controlling of the system, especially the induced draft fan, the primary air, and the recirculated exhaust stack gas entering the gasifier.

A further object of the present invention is to provide a multi-clone cyclone chamber between the boiler and the exhaust stack to remove particulates from the exhaust gas.

An added object of the present invention is to provide refractory walls around the gasifier in order to have the gasifier working under nearly adiabatic conditions (retain the heat within the gasifier) and allow more even controlled operation of the system by thermally isolating the system.

In brief, a thick fuel bed gasifier (gasification chamber) has controlled evenly distributed underfed primary air through the fuel bed supported by a sloping grate of transverse C-beams containing a refractory material (possibly sand) with evenly distributed air spaces between beams.

One ore more feed screws feeds biomass fuel, of a possible wide range of moisture contents, at a controlled rate through an air lock or other means to maintain pressure within the gasifier onto the sloping grate. A level indicator, preferably a device using gamma rays, monitors the level of the fuel through the wall of the gasifier and signals the programmable logic controller to control the fuel feed to maintain the fuel level at a nearly constant height.

A water cooled ash auger at the bottom of the sloping grate removes ash through an air lock or other means to maintain pressure within the gasifier.

The gas is drawn into an upper positioned burner (blast tube) above the fuel bed. A controlled air flow is directed at an angle (to create a swirling effect) into the burner inlet in order to provide a flow with high turbulence in the burner to create a "jet" of flame blasting into a boiler or other desired system requiring heat A donut-shaped neck inside the burner forms a seal around the outlet from the burner preventing exhaust gas from flowing back into the burner.

System feedback controls via the programmable logic controller enable constantly managed gasification and combustion kept at an even rate and the process being clean so that the system needs no down time for cleaning. Many elements of the system are monitored for feedback control, including: moisture content of the fuel actually being in the process, fuel bed height, pressure below the fuel bed grate and above the fuel bed in the gasifier, boiler temperature and pressure, and exhaust stack gas moisture and oxygen content.

The programmable logic controller (PLC) has a modem for remote access control of the system. The PLC controls fuel feed rate, primary air feed to the gasifier and secondary air feed to the burner through an air valve and damper, recycled combustion gases to the gasifier directed at the ash auger zone, timing of ash auger operation, and speed of the induced draft fan.

An advantage of the present invention is that it creates a constantly managed gasification with even production of combustible gas in a thick fuel bed biomass gas producing system, eliminating the inefficient up and down cycles of other systems.

Another advantage of the present invention is that the system doesn't need to be shut down for regular cleanings, thereby producing a constant output.

An additional advantage of the present invention is that it permits the use of a wide range of types of fuels with varying moisture contents and including peat, and bark, and fuel containing dirt in a constant heat production output without shutdowns to remove clinkers.

One more advantage of the present invention is that the high power produced and the constantly monitored control system enables large biomass gasification systems.

Yet another advantage of the present invention is that the efficiency of the system and the particulate reduction components enable a biomass heating system with clean emissions.

BRIEF DESCRIPTION OF THE DRAWING

These and other details of our invention will be described in connection with the accompanying drawings, which are furnished only by way of illustration and not in limitation of the invention, and in which drawings.

BEST MODE FOR CARRYING OUT THE INVENTION

Figure 1:
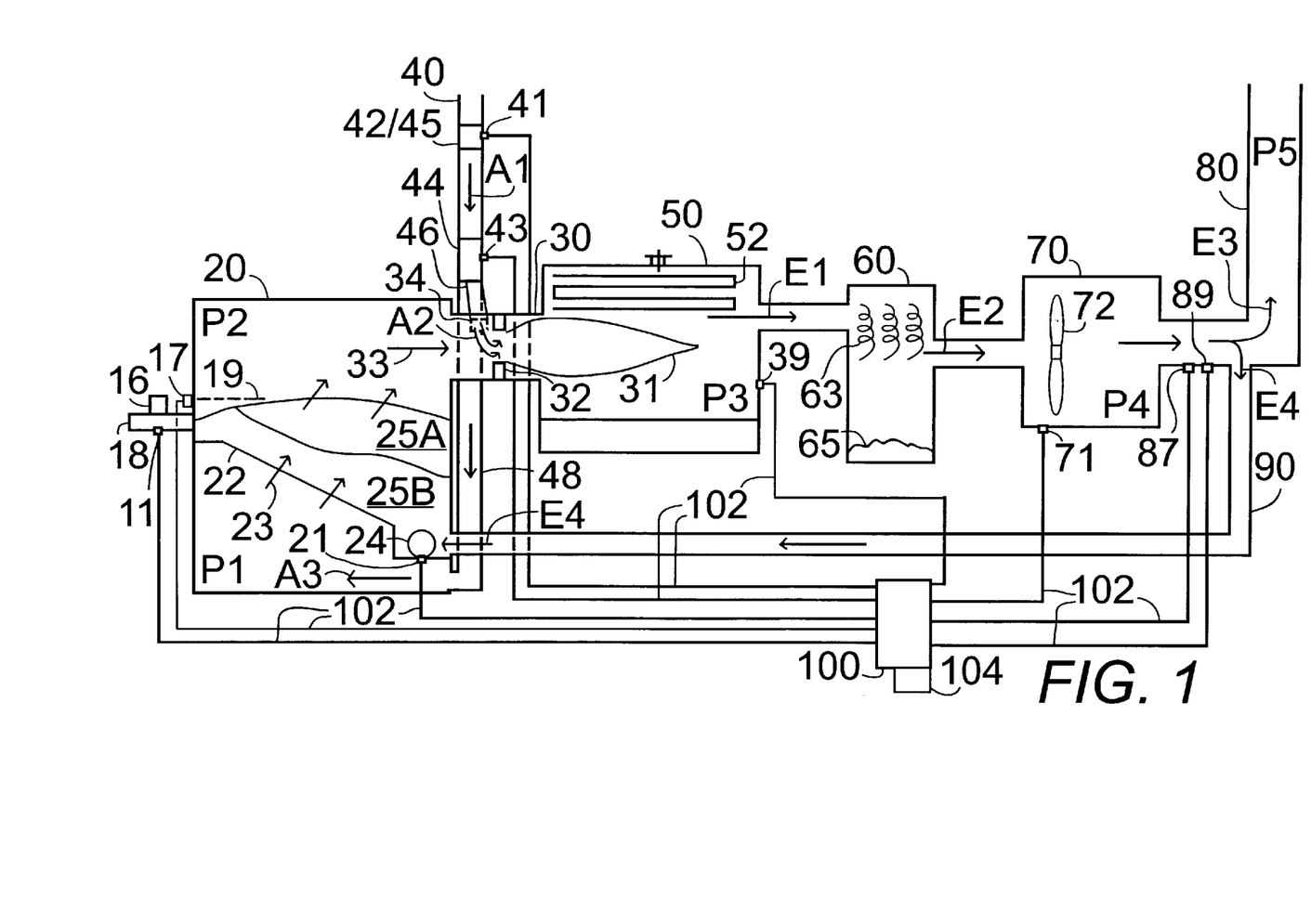
FIG. 1 is a diagrammatic view of the invention showing the components, the control and sensing wiring, the flow of air and the flow of gases.

In FIG. 1 a controlled thick-fuel-bed elevated-burner biomass gasification and combustion heating system comprises a gasifier 20 (gasification chamber) for gasifying biomass fuel 25A and 25B and transforming it into combustible (pyrolytic) gases 33, a burner 30 (blast tube) for generating a flame 31 (jet or fire blast) from the combustible gases 33, a heating chamber 50 with a heat applying means such as a furnace, a cyclone chamber 60 for removing particulates 65 from exhaust gas E1, a variable fan 70 for controlling pressure in the system and transporting exhaust gases E2 out of the system, an air A1 intake 40, an exhaust recycling conduit 90 for recycling exhaust gases back into the gasifier 20, and a programmable logic controller 100 with wires 102 connected to various sensors and various controls for the system.

Figure 2:
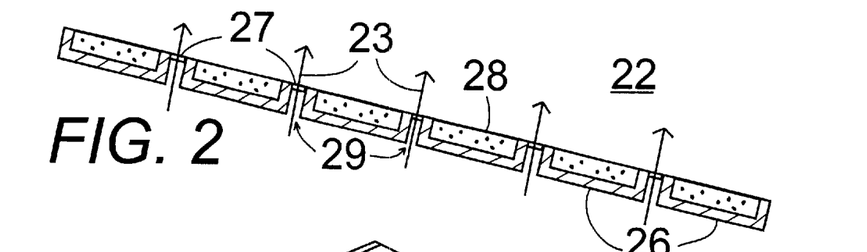
FIG. 2 is a cross-sectional elevation view of the fuel grate showing the primary air passing up throw the slots between the grate bars.
Figures 3, 4:
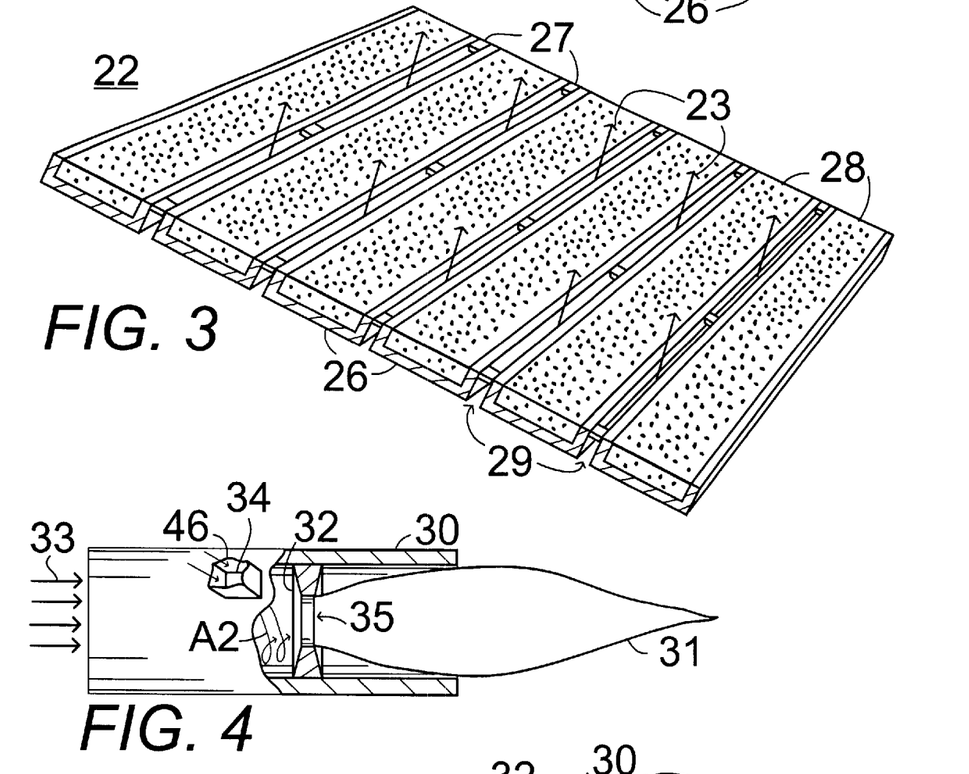
FIG. 3 is a perspective view in partial section of the fuel grate.
FIG. 4 is an elevated view in partial section of the burner (blast tube) showing the flame jet or blast.

In FIGS. 1, 2 and 3, the gasifier 20 for producing combustible gases 33 from a variety of types and qualities of biomass fuels 25A and 25 has a thick refractory air-tight wall and a fuel grate 22 as a means for supporting a thick fuel bed and as a means for evenly distributing an underfed primary air flow through the fuel bed.

The fuel grate 22 comprises a series of parallel C-channels 26 filled with (for example) refractory material (or sand) 28 extending across the width of the grate and sloping downwardly, preferably at an angle of 18–20° from the horizontal. A series of tabs 27 between each adjacent pair of C-channels 26 separates the C-channels 26 to form open slots 29 between the C-channels 26 as the means for directing primary air 23 flow up through the grate and through the fuel and to move ash down the grate and toward the ash auger 24 at the bottom of the grate with the slope assisting in causing ash to move downward toward the ash auger 24.

The air flow cools the grate to eliminate harm to the grate in the case of losing the fuel feed and then getting heat into the grate. During normal operation a bottom portion of the fuel 25B keeps the hot gasification top layer of the fuel 25A from harming the fuel grate 22, thereby preventing the need for continual maintenance of the fuel grate 22 and enabling the use of relatively inexpensive materials to fabricate the fuel grate which lasts for an extended period of time without the need for replacement.

A variable means for feeding biomass fuel into the gasification chamber at a controlled rate comprises at least one or more feed screws 18 capable of moving biomass fuel from a fuel inlet 16 from a storage bin of fuel (not shown) into the gasifier 20 without disturbing the pressure inside the gasifier, such as by using an air lock.

A means for controlling the fuel bed height comprises a level indicator 17 attached to the outside of the gasifier, the level indicator being capable of monitoring the fuel bed height through the wall of the gasifier using (for example) gamma rays 19 to detect the fuel height and the level indicator being capable of sending signals via a wire 102 to the programmable logic controller 100 to control the feed screws by a feed screw control 11 connected by a wire 102 to the programmable logic controller 100 to keep the thick fuel bed a nearly constant height determined by the optimum fuel consumption and gas producing rate for the type of fuel and boiler or other heat application device employed.

A means for removing the ash from the gasification chamber comprises a water-cooled ash auger 24 positioned below the fuel bed at the lower end of the sloping fuel grate 22. The ash auger 24 is positioned in the direct path of the portion of clean emission exhaust gases E4 diverted into the gasifier 20 through a conduit 90 to prevent clinkering. The ash auger 24 is capable of moving ash out of the gasifier without disturbing the pressure inside the gasifier 20, such as by using an air lock. The ash auger is controlled by an auger control 21 receiving an auger control signal over a wire 102 from the programmable logic controller 100, the auger control signal selected from the auger control signals consisting of a timed control, a control based on the controlled rate of loading biomass fuel, and a temperature control.

Figure 5:
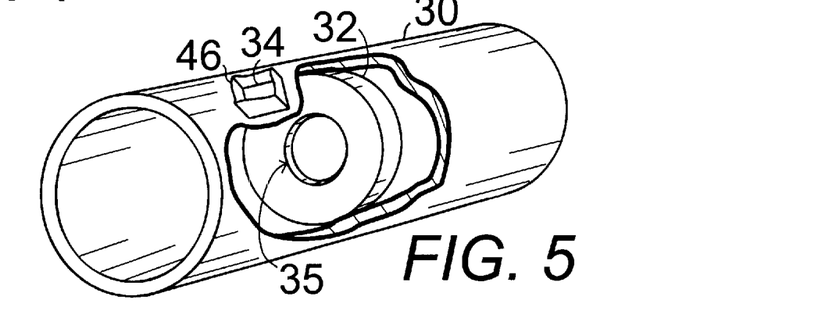
FIG. 5 is a perspective view in partial section of the burner (blast tube).

In FIGS. 1, 4 and 5, a burner 30 (horizontal blast tube) is positioned above the fuel bed 25A and 25B and leads out of the gasifier 20 (gasification chamber). The burner 30. comprises a cylindrical tube inlet part having an off-center air inlet opening 34 into a portion of a wall of the cylindrical tube to admit a flow of secondary air A2 swirling into the burner from an angled burner air inlet conduit 46 in order to mix the secondary air A2 with the combustible gases 33 from the gasifier 20 to crack the gases and create a jet or fire blast flame 31.

The means for preventing the combustion gases from passing back into the burner comprises a donut-shaped ring 32 of material contacting the inner wall of the cylindrical tube of the burner 30 and forming a circular opening 35 smaller than the cylindrical tube diameter in a position adjacent to the air inlet 34, between the air inlet 34 and the heat exchange chamber 50, wherein the flame 31 fills the circular opening 35 of the donut-shaped ring 32.

A means for controlling a flow of air into the gasifier and into the burner 30 comprises an adjustable air valve 42 controlling the flow of air A1 from outside the heating system through an air intake conduit 40, and further comprises an adjustable damper 44 for directing and varying the rate of flow of primary air A3 through a,primary air conduit 48 which communicates with the gasifier 20 underneath the fuel bed grate and also for directing and varying the rate of flow of secondary air A2 through an angled burner air inlet conduit 46 into the burner through air inlet opening 34.

The adjustable air valve 42 is controlled by an air valve controller 41 and the adjustable damper 44 is controlled by a damper controller 43, both controllers being connected by wires 102 to the programmable logic controller 100 and both acting to control the flow of air in response to the oxygen content of the exhaust gases E2 measured by an oxygen sensor 87 adjacent to the exhaust stack 80.

A heat exchange chamber 50 receives the flame 31 from the burner 30 and houses a means for applying heat produced from the system, such as (for example) a three-pass boiler with heat exchange tubes 52 for picking up heat from the flame 31 and using it to heat a building . Many different means for applying heat can be used, such as a variety of furnaces, water heaters, evaporators for sugaring or any other device requiring a source of heat such as steam engines, steam turbines and (using pressurized gasification and combustion) gas turbines.

A heat and pressure sensor 39 monitors temperature and pressure of the means for applying heat and sends signals through a wire 102 to the programmable logic controller 100 to control a variable speed induced draft fan 70 which transport the exhaust air E1 out of the heat exchange chamber 50 through a cyclone chamber 60 to remove particulates 65 and produce clean exhaust air E2.

The variable speed induced draft fan 70 with fan blades 72 is positioned between the heat exchange chamber 50 and the exhaust stack 80, and preferably after the cyclone chamber 60, and serves as both the means for variably controlling pressure (P1, P2, P3, P4 and P5) throughout the system and for transporting exhaust gases E1 from the heat exchange chamber 50 at a variable rate.

The induced draft fan 70 is capable of varying speed and is sufficiently large to create a negative pressure in the entire system, thereby controlling the flow of gases through the system as well as varying the rate of transporting exhaust gases from the heat exchange chamber in response to the pressure and temperature of the heat exchange chamber 50 detected by the pressure and temperature sensor 39 which sends signals through a wire 102 to the programmable logic controller 100, which sends control signals through a wire 102 to a fan control 71.

Another means to provide air and gas flow through the gasifier and the rest of the system is to add a combined primary and secondary air fan 45 (no separate fan for the secondary air) in proximity to or in place of the air valve 42 to support the stack gas fan 70.

A means for removing particulates from the exhaust gases E1 from the heat exchange chamber 50 to produce clean emission exhaust gases E2 comprises a cyclone chamber 60 preferably positioned between the heat exchange chamber 50 and the induced draft fan 70. The cyclone chamber 60 preferably contains a multi-clone 63 or number of small cyclones capable of spinning the exhaust gases E1 and forcing particulates out of the exhaust gases to the sides of the cyclone chamber so that the particulates 65 fall to the bottom of the chamber, where they may be removed.

The exhaust gas recycling conduit 90 adjacent to the exhaust stack 80 diverts a portion of the clean emission exhaust gases E4 into the gasifier 20 directed onto the water-cooled ash auger 24 and up into the fuel bed 25A and 25B. The remainder of the clean emission exhaust gases E3 go up the exhaust stack 80 and out into the atmosphere.

The oxygen sensor 87 for monitoring the oxygen content of the exhaust gases is preferably positioned between the induced draft fan 70 and the exhaust stack 80 and sends signals through a wire 102 to the programmable logic controller 100 which then sends signals through wires 102 to the air valve control 41 for the adjustable air valve 42 and to the damper control 43 for the adjustable damper 44 to control the air A1 into the gasifier 20 and burner 30.

A moisture sensor 89 for monitoring moisture content of the exhaust gases E2 is also preferably positioned between the induced draft fan 70 and the exhaust stack 80 and sends signals through a wire 102 to the programmable logic controller 100 which then sends signals through wires 102 to the air valve control 41 for the adjustable air valve 42 and/or optional combined primary and secondary air fan 45 and to the damper control 43 for the adjustable damper 44 to control the air A1 into the gasifier 20.

The moisture sensor 89 works in accordance with the principles taught in co-inventor Asplund's U.S. Pat. No. 6,022,387 issued Feb. 8, 2000, wherein a maximum gasification air flow for a gasifier is determined by obtaining a maximum gasifier power according to different moisture contents of the fuel in the actual ongoing process (not the real moisture content in the fuel fed); determining a relationship between the moisture content of the fuel and at least one of a maximum gasification air flow and then a maximum total air flow; recording the moisture content in the fuel in the actual ongoing process through measuring the oxygen content in both wet and dry stack gas; and controlling the gasification air flow or the total air flow according to the moisture content of the fuel in the ongoing process.

The programmable logic controller 100 is connected by wires 102 or by remote wireless signals to all of the sensor means for monitoring 17, 39, 87 and 89 and all of the control means for controlling 11, 21, 41, 43 and 71. The programmable logic controller 100 is capable of being programmed to control all of the means for controlling in response to all of the means for monitoring so that the heating system operates at a constant desired level of performance.

The programmable logic controller 100 has a remote access modem 104 so that the programmable logic controller is capable of being programmed from a remote location.

In application, the controlled heating method for biomass gasification in a thick-fuel-bed elevated-burner heating system comprises a series of steps which are all coordinated and controlled by the programmable logic controller 100 to maintain ongoing steady state operation at a desired level for any type or moisture content of biomass fuel.

One step comprises loading biomass fuel by a variable means for feeding biomass fuel, at least one or more feed screws 18, at a controlled rate into a gasification chamber 20, without disturbing the pressure in the gasifier such as by using an air lock, to form a thick fuel bed 25A and 25B onto a fuel grate 22 for supporting the thick fuel bed and distributing the primary air A3 in order to get an even gas flow through the fuel bed by providing a high enough pressure drop for the primary air to flow through the fuel grate. And the step further comprises directing primary air flow 23 through open slots 29 between C-channels 26 filled with (for example) refractory material 28 in the fuel grate 22. And further comprises maintaining a nearly constant fuel bed height by installing a level indicator 17 attached to the outside of the gasifier 20, and using the level indicator to monitor the fuel bed height with (for example) gamma rays 19 through the wall of the gasifier and sending signals from the level indicator through a wire 102 to the programmable logic controller 100 which sends signals through a wire 102 to the feed screw control 11 to control the feed screw (or screws) 18 to keep the thick fuel bed at nearly constant height.

The next step comprises igniting the fuel bed by a conventional means in order to start up the pyrolysis and gasification process.

The next step comprises monitoring and controlling the gasification of any of a variety of types and qualities of biomass fuels to transform the biomass fuels into combustible gases 33 and ash.

The next step comprises removing the ash from the gasifier 20 by a water-cooled ash auger 24 wherein the cooling helps prevent harm to the auger, and operating the water-cooled ash auger 24 by an auger control 21 via signals from the programmable logic controller 100 selected from the auger control signals consisting of a timer control, a control based on the controlled rate of loading biomass fuel, and/or a temperature control.

The next step comprises combusting or cracking the combustible gases 33 and creating a flame 31 (jet or blast flame) out of the burner 30 positioned above the fuel bed 25A and 25B and leading out of the gasifier 20 by receiving and igniting the combustible gases 33 from the gasifier by admitting a swirling stream of air A2 swirling into an off-center air inlet 34 in a portion of a wall of the inlet part of the burner 30 and recirculating the burning products inside the outlet part of the burner 30 causing the main turbulence and mixing in order to get a soot free combustion and an even temperature across the flame thereby minimizing the production of thermal nitrogen oxide.

The step further comprising preventing the combustion gases 33 from passing back into the burner 30 by a donut-shaped ring of material 32 contacting the inner wall of the outlet part of the burner 30 and forming a circular opening 35 smaller than the burner outlet diameter in a position adjacent to the air inlet 34, between the air inlet 34 and the heat exchange chamber 50, wherein the flame 31 fills the circular opening 35 of the donut-shaped ring 32.

The next step of controlling a flow of air into the gasifier 20 and into the burner 30 comprises controlling the flow of air A1 from outside the heating system by using an adjustable air valve 42, and further comprises directing and varying the rate of flow of air A1 by using an adjustable damper 44 to direct the air both into a conduit 48 which communicates with the gasifier 20 underneath the fuel bed grate and into a conduit 46 that communicates with the burner 30. The step of controlling the flow of air to the burner varying in response to the oxygen content of the exhaust gases E2 by sending signals over a wire 102 from an oxygen sensor 87 adjacent to the stack 80 to the programmable logic controller 100 and then to the air valve control 41 and the damper control 43.

The step further comprises getting the flame 31 into the heat exchange chamber 50 which receives the flame 31 from the burner 30 and houses a means for applying heat, such as (for example) a multiple pass boiler with heat exchange tubes 52 (or any other means for transforming energy by heat), the heat from the flame 31 being transferred to the heat exchange tubes 52.

The next step comprises monitoring temperature and pressure in the means for applying heat by a temperature and pressure sensor 39.

The next step comprises variably controlling pressure throughout the system and transporting exhaust gases from the heat exchange chamber at a variable rate by creating a negative pressure in the entire system by controlling a variable speed induced draft fan 70 positioned between the heat exchange chamber 50 and the exhaust stack 80, the induced draft fan 70 being capable of varying speeds and being sufficiently large to create a negative pressure in the entire system, thereby controlling the flow of gases through the system, and further comprises varying the rate of transporting exhaust gases from the heat exchange chamber in response to the pressure and temperature of the heat exchange chamber 50.

The next step comprises removing particulates 65 from the exhaust gases E1 by means of a cyclone chamber 60 to produce clean emission exhaust gases E2.

The next step comprises diverting a portion of the clean emission exhaust gases E4 through the exhaust gas recycling conduit 90, adjacent to the exhaust stack 80 diverting the portion of the clean emission exhaust gases E4 into the gasification chamber 20 directed onto the water-cooled ash auger 24 and up into the fuel bed 25A and 25B. The remainder of the clean emission exhaust gases E3 go up the exhaust stack 80 and out into the atmosphere.

The next step comprises monitoring oxygen content of the exhaust gases E2, preferably after removing the particulates, by using an oxygen sensor 87, preferably positioned between the induced draft fan 70 and the exhaust stack 80. The oxygen sensor 87 sends signals through a wire 102 to the programmable logic controller 100 which then sends signals through wires 102 to the air valve control 41 for the adjustable air valve 42 and to the damper control 43 for the adjustable damper 44 to control the air A1 into the gasifier 20 and burner 30.

The next step comprises using a moisture sensor 89 for recording moisture content of the exhaust gases E2 by monitoring oxygen content in both wet and dry stack gas. The moisture sensor 89 is also preferably positioned between the induced draft fan 70 and the exhaust stack 80 and sends signals through a wire 102 to the programmable logic controller 100 which then sends signals through wires 102 to the air valve control 41 for the adjustable air valve 42 and to the damper control 43 for the adjustable damper 44 to control the air A1 into the gasifier 20 and burner 30.

The next step is ongoing throughout the entire operation and comprises wiring a programmable logic controller into all of the sensor means for monitoring 17, 39, 87 and 89 and all of the control means for controlling 11, 21, 41, 43 and 71, and programming the programmable logic controller to control all of the means for controlling in response to all of the means for monitoring so that the heating system operates at a constant desired level of performance.

The step further comprises providing the programmable logic controller 100 with a remote access modem 104 and programming the programmable logic controller from a remote location.

It is understood that the preceding description is given merely by way of illustration and not in limitation of the invention and that various modifications may be made thereto without departing from the spirit of the invention as claimed.

What is claimed is:

1. A controlled thick-fuel-bed elevated-burner biomass gasification heating system comprising:

a gasifier for gasification of a variety of types and qualities of biomass fuels with a means for supporting a thick fuel bed and distributing a primary air flow in such a way to get an even gas flow through the fuel bed, and a means for directing the primary air flow, a means for controlling fuel bed height, the gasifier being capable of transforming the biomass fuels into combustible gases and ash;

a variable means for feeding biomass fuel into the gasifier at a controlled rate;

a means for removing the ash from the gasifier;

a burner positioned above the fuel bed and leading out of the gasifier for receiving and igniting the combustible gases from the gasifier and burning the gases by creating a flame out of the burner providing heat and exhaust gases, the burner having a means for preventing the exhaust gases from passing back into the burner outlet part;

a means for controlling a flow of air into the gasifier and into the burner;

a heat exchange chamber for receiving the flame from the burner and for housing a means for receiving and applying heat produced from the system, including a means for monitoring temperature and pressure of the means for applying heat;

a means for variably controlling pressure throughout the system and for transporting the exhaust gases from the heat exchange chamber at a variable rate;

a means for removing particulates from the exhaust gases to produce clean emission exhaust gases;

a means for diverting a portion of the clean emission exhaust gases through a conduit and into the gasification chamber and diverting the remainder of the clean emission exhaust gases up an exhaust stack and out into the atmosphere;

a means for monitoring the oxygen content of the exhaust gases;

a means for monitoring the moisture content of the exhaust gases;

a means for sending feedback signals from all of the means for monitoring to control all of the means for controlling in the system.

2. The heating system of claim 1 wherein the burner comprises a cylindrical tube having an off-center air inlet into a portion of a wall of the cylindrical tube to admit a flow of air swirling into the burner for mixing with the combustible gas from the gasifier, the burner being capable of burning the combustible gases from the gasifier to create the flame, and the means for preventing the exhaust gases from passing back into the burner comprises a donut-shaped ring of material contacting the inner wall of the cylindrical tube and forming a circular opening smaller than the cylindrical tube diameter in a position adjacent to the air inlet, between the air inlet and the heat exchange chamber, wherein the flame fills the circular opening of the donut-shaped ring.

3. The heating system of claim 1 wherein the means for sending feedback signals comprises a programmable logic controller wired into all of the means for monitoring and all of the means for controlling, the logic controller capable of being programmed to control all of the means for controlling in response to all of the means for monitoring so that the heating system operates at a constant desired level of performance.

4. The heating system of claim 3 wherein the programmable logic controller has a remote access modem so that the programmable logic controller is capable of being programmed from a remote location.

5. The heating system of claim 1 wherein the variable means for feeding biomass fuel into the gasifier comprises at least one feed screw capable of feeding biomass fuel into the gasifier without disturbing the pressure inside the gasifier.

6. The heating system of claim 5 wherein the means for controlling the fuel bed height comprises a fuel bed level indicator attached to the outside of the gasifier, the fuel bed level indicator capable of monitoring the fuel bed height through the wall of the gasifier and being capable of sending signals to control the feed screws to keep the thick fuel bed at nearly constant height.

7. The heating system of claim 1 wherein the means for supporting a thick fuel bed and evenly distributing the primary air through the fuel bed comprises a series of parallel C-channels filled with refractory material extending across the width of the gasification chamber and sloping downwardly from the variable means for feeding biomass fuel into the gasifier to the means for removing the ash from the gasifier, and the means for directing primary air flow comprises air spaces between the C-channels created by a series of tabs between each adjacent pair of C-channels to separate the C-channels.

8. The heating system of claim 1 wherein the means for removing the ash from the gasifier comprises a water-cooled ash auger positioned below the fuel bed in the direct path of the portion of the clean emission exhaust gases diverted into the gasifier to prevent possible clinkering, the ash auger being capable of moving ash out of the gasifier without disturbing the pressure inside the gasifier, the ash auger being capable of being controlled by an auger control signal selected from the auger control signals consisting of a timer control, a control based on the controlled rate of loading biomass fuel and a temperature control.

9. The heating system of claim 1 wherein the means for controlling a flow of air into the gasifier and into the burner comprises an adjustable air valve controlling the flow of air from outside the heating system into a conduit which communicates with the gasifier underneath the fuel bed grate and communicates with the burner, and further comprises an adjustable damper for directing and varying the rate of flow of air both into the gasifier and into the burner, the means for controlling the flow of air being capable of varying the flow of air in response to the oxygen content of the exhaust gases.

10. The heating system of claim 1 wherein the means for variably controlling pressure throughout the system and for transporting exhaust gases from the heat exchange chamber at a variable rate comprises a variable speed induced draft fan positioned between the heat exchange chamber and the exhaust stack, the induced draft fan being capable of varying speeds and being sufficiently large to create a negative pressure in the entire system, thereby controlling the flow of gases through the system, and the induced draft fan being capable of varying the rate of transporting exhaust gases from the heat exchange chamber in response to the pressure and temperature of the heat exchange chamber or other means for governing the load.

11. The heating system of claim 1 wherein the means for removing particulates from the exhaust gases comprises a cyclone chamber containing a multi-clone having a number of small cyclones capable of spinning the exhaust gases and forcing particulates out of the exhaust gases to the sides of the cyclone chamber so that the particulates fall to the bottom of the chamber, where they may be removed, the cyclone being positioned between the heat exchange chamber and the means for variably controlling pressure throughout the system and for transporting exhaust gases from the heat exchange chamber at a variable rate.

12. The heating system of claim 1 further comprising a combined primary and secondary air fan means for drawing outside air into the gasifier and burner, the combined fan means being in communication with the gasifier and the burner.

13. A controlled heating method for biomass gasification and combustion in a thick-fuel-bed elevated-burner heating system, the heating method comprising:

the step of loading biomass fuel by a variable means for feeding biomass fuel at a controlled rate into a gasifier, without disturbing the pressure in the gasifier, to form a thick fuel bed on a means for supporting a thick fuel bed and a means for evenly distributing a primary air flow through the fuel bed and maintaining a nearly constant fuel bed height by adding fuel in response to a means for controlling fuel bed height;

the step of igniting the fuel bed by a conventional means;

the step of monitoring and controlling the gasification of any of a variety of types and qualities of biomass fuels to transform the biomass fuels into combustible gases and ash;

the step of removing the ash from the gasifier by an ash removal means without disturbing the pressure in the gasifier;

the step of creating a flame out of a burner positioned above the fuel bed and leading out of the gasifier by receiving and igniting the combustible gases from the gasifier in a swirling stream of air in the burner, the burner having a means for preventing the gases from passing back into the burner, the flame extending into a heat exchange chamber for receiving the flame from the burner and for housing a means for applying heat produced from the system, the heat from the flame being transferred to the means for applying heat;

the step of controlling a flow of air into the gasifier and into the burner by a means for controlling the flow of air;

the step of monitoring temperature and pressure in the means for applying heat by a means for monitoring temperature and pressure;

the step of variably controlling pressure throughout the system and transporting exhaust gases from the heat exchange chamber at a variable rate by a means for controlling pressure and for transporting the exhaust gases;

the step of removing particulates from the exhaust gases to produce clean emission exhaust gases by a means for removing particulates;

the step of diverting a portion of the clean emission exhaust gases through a conduit and into the gasifier and diverting the remainder of the clean emission exhaust gases up an exhaust stack and out into the atmosphere;

the step of monitoring oxygen content of the exhaust gases by an oxygen monitoring means;

the step of monitoring moisture content of the exhaust gases by a moisture monitoring means;

the step of sending feedback signals from all of the means for monitoring to control all of the means for controlling in the system.

14. The heating method of claim 13 wherein the step of creating the flame comprises admitting an air flow swirling into an off-center air inlet in a portion of a wall of the burner, the burner being configured as a cylindrical tube, and the means for preventing the combustion gases from passing back into the burner comprises a donut-shaped ring of material contacting the inner wall of the cylindrical tube and forming a circular opening smaller than the cylindrical tube diameter in a position adjacent to the air inlet between the air inlet and the heat exchange chamber, wherein the flame fills the circular opening of the donut-shaped ring.

15. The heating method of claim 13 wherein step of sending feedback signals comprises wiring a programmable logic controller into all of the means for monitoring and all of the means for controlling, and programming the logic controller to control all of the means for controlling in response to all of the means for monitoring so that the heating system operates at a constant desired level of performance.

16. The heating method of claim 15 wherein the programmable logic controller has a remote access modem and the step of sending feedback signals further comprises programming the programmable logic controller from a remote location.

17. The heating method of claim 13 wherein the variable means for feeding biomass fuel into the gasifier comprises at least one feed screw capable of transporting biomass fuel into the gasifier and wherein the step of controlling the fuel bed height comprises installing a level indicator attached to the outside of the gasification chamber, and using the level indicator to monitor the fuel bed height through the wall of the gasification chamber and sending signals from the level indicator to control the at least one feed screw to keep the thick fuel bed at a nearly constant height.

18. The heating method of claim 13 wherein the means for removing the ash from the gasifier comprises a water-cooled ash auger positioned below the fuel bed, and the step of removing the ash from the gasifier comprises directing the diverted portion of the clean emission exhaust gases onto the ash auger to prevent clinkering and operating the water-cooled ash auger by an auger control signal selected from the auger control signals consisting of a timer control, a control based on the controlled rate of loading biomass fuel, and a temperature control.

19. The heating method of claim 13 wherein the step of controlling the flow of air into the gasifier and into the burner comprises controlling the flow of air from outside the heating system by using an adjustable air valve into a conduit which communicates with the gasifier underneath the fuel bed grate and communicates with the burner through another conduit, and further comprises directing and varying the rate of flow of air by using an adjustable damper to direct the air both into the gasifier and into the burner, the step of controlling the flow of air varying in response to the oxygen content of the exhaust gases.

20. The heating method of claim 13 wherein the step of variably controlling pressure throughout the system and transporting exhaust gases from the heat exchange chamber at a variable rate comprises creating a negative pressure in the entire system by controlling a variable speed induced draft fan positioned between the heat exchange chamber and the exhaust stack, the induced draft fan being capable of varying speeds and being sufficiently large to create a negative pressure in the entire system, thereby controlling the flow of gases through the system, and further comprises varying the rate of transporting exhaust gases from the heat exchange chamber in response to the pressure and temperature of the heat exchange chamber.

* * * * *